(12) United States Patent
Thomas

(10) Patent No.: US 8,194,298 B2
(45) Date of Patent: Jun. 5, 2012

(54) METHODS AND SYSTEMS FOR COMPOSITE PRINTER TRANSFORMS

(75) Inventor: John C. Thomas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 910 days.

(21) Appl. No.: 11/536,083

(22) Filed: Sep. 28, 2006

(65) Prior Publication Data
US 2008/0079966 A1   Apr. 3, 2008

(51) Int. Cl.
*H04N 1/46* (2006.01)
*G06K 9/00* (2006.01)
*G03F 3/08* (2006.01)

(52) U.S. Cl. .............. 358/518; 358/504; 382/167

(58) Field of Classification Search .......... 358/1.9, 358/500, 504, 518; 382/162, 167
See application file for complete search history.

(56) References Cited

U.S. PATENT DOCUMENTS

| | | | |
|---|---|---|---|
| 5,309,257 A * | 5/1994 | Bonino et al. | 358/504 |
| 6,341,833 B1 | 1/2002 | Liu et al. | |
| 6,351,320 B1 * | 2/2002 | Shin | 358/1.9 |
| 6,421,140 B1 | 7/2002 | Hui | |
| 6,594,028 B1 | 7/2003 | Hamamoto et al. | |
| 6,633,400 B1 * | 10/2003 | Sasaki et al. | 358/1.15 |
| 6,803,921 B1 * | 10/2004 | Balasubramanian et al. | 345/597 |
| 2002/0030833 A1 | 3/2002 | Kuwata et al. | |
| 2002/0063911 A1 | 5/2002 | Hui | |
| 2002/0140754 A1 | 10/2002 | Someno | |
| 2002/0159083 A1 | 10/2002 | Arai et al. | |
| 2003/0048464 A1 * | 3/2003 | Yamada et al. | 358/1.9 |
| 2003/0053682 A1 * | 3/2003 | Haikin et al. | 382/162 |
| 2003/0071823 A1 * | 4/2003 | Fukasawa | 345/589 |
| 2003/0117639 A1 | 6/2003 | Milton et al. | |
| 2003/0189716 A1 * | 10/2003 | Tsuji et al. | 358/1.9 |
| 2004/0027599 A1 | 2/2004 | Walmsley | |
| 2004/0061881 A1 * | 4/2004 | Shimizu et al. | 358/1.9 |
| 2004/0179214 A1 | 9/2004 | Yabe | |
| 2004/0184054 A1 | 9/2004 | Takahira et al. | |
| 2005/0200866 A1 * | 9/2005 | Hoshii et al. | 358/1.9 |
| 2005/0206651 A1 | 9/2005 | Sawada et al. | |
| 2005/0206929 A1 * | 9/2005 | Tsuji | 358/1.9 |

FOREIGN PATENT DOCUMENTS

| | | |
|---|---|---|
| JP | 2005022293 | 1/2005 |
| JP | 2005196454 | 7/2005 |
| JP | 2006-018648 | 1/2006 |
| JP | 2006031376 | 2/2006 |
| JP | 2006129508 | 5/2006 |

OTHER PUBLICATIONS

Japanese Patent App. No. 2007216085—Office Action dated Feb. 5, 2010.
Decision of Refusal issued against Japanese Patent Application No. 2007-216085, dated Apr. 27, 2010; p. 1.
Abstract of primary reference Japanese Patent Publication No. 2006-018648 in Decision of Refusal against Japanese Patent Application No. 2007-216085; p. 1.

* cited by examiner

*Primary Examiner* — James A Thompson
(74) *Attorney, Agent, or Firm* — Chernoff Vilhauer McClung & Stenzel, LLP

(57) ABSTRACT

Embodiments of the present invention comprise systems and methods for generating and applying composite color transforms.

16 Claims, 4 Drawing Sheets

METHODS AND SYSTEMS FOR COMPOSITE PRINTER TRANSFORMS

FIELD OF THE INVENTION

Embodiments of the present invention comprise methods and systems for generating and applying composite printer transforms.

BACKGROUND

The operation of printing with calibrated colors is computationally expensive. Transformation from the input (e.g. computer display) color space to the output (e.g. native printer) color space frequently involves 3-D or 4-D, real number interpolation. Every color that is used on the printed page must be separately transformed. This is a significant problem when printing continuous tone images where virtually every pixel represents a different color. Color transformations can represent a significant portion of the total time spent processing the printed page. A method that reduces the number of color transformations involved in the printing work flow would be welcome.

Standard graphic arts printing workflow involves a host-based application working in a calibrated color space (e.g. ink simulation), a printer driver and a color printer. The application specifies and displays its colors in a calibrated color space. In the case of a PCL printer driver the driver must convert the application color space into a color space understood by the PCL page description language. PCL-5c understands only the (semi-calibrated) sRGB color space and (uncalibrated) CMY. The converted page description is then passed to the printer, where the firmware transforms the page description one or more times into the native printer color space.

Some PostScript printer drivers work essentially the same way except that PostScript may accept the calibrated application color space (e.g. CIE) directly, possibly avoiding one color transformation in the printer driver. Unfortunately PostScript uses the XYZ calibrated color space internally and thus must first convert the page description into the XYZ color space before converting it back into the printer device color space. Thus PostScript, as with PCL, uses a minimum of two color space conversions when printing calibrated colors.

Real work flows are frequently more complex than described above. Additional color transformations may be required.

SUMMARY

Some embodiments of the present invention comprise methods and systems for generating composite printer transforms. Some embodiments may combine printer color profile data with input color space transform data to create a composite printer transform. In some embodiments, the composite printer transform may be applied to an image. In some embodiments, a plurality of composite printer transforms are created and a transform is selected for each print job based on the print job color space.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
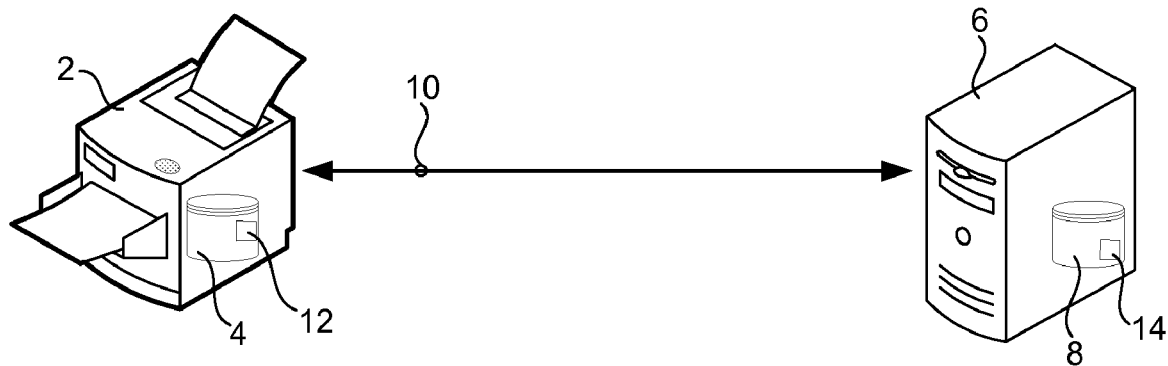
FIG. 1 is a diagram showing hardware elements of some embodiments of the present invention.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some color transformations may be mathematically described through matrices including, but not limited to 3- and 4-D matrices. For some transformations the data values are integers. For other transformations the data are real numbers. Either way, it is possible to combine multiple transformations into a single transformation by multiplying the associated matrices. One composite transformation is computationally more efficient than multiple separate transformations.

In some methods, one color transformation may occur in the printer driver and another transformation may occur in the printer firmware. In these cases, computation of a composite color transform requires the transfer of transformation data between the printer driver (residing on a host computer) and the printer firmware.

This transfer may be performed by downloading the printer driver transformation to the printer, performing the matrix multiplication and saving the result. To accomplish this, a separate profile must be stored on the printer for each combination of host operating system (OS) and application color space. This approach is not widely used because of limited memory in the printer.

Historically, printers were connected to their host computers by a uni-directional network connection. This prevented upload of even small amounts of data, let alone any large color characterization profiles. Some host platforms, notably the Apple Macintosh, have long printed over a bi-directional connection. However, the slow speed of its historic data connection discouraged upload of any large data sets.

Today, host computers are commonly connected to printers over fast bi-directional network links. However the color printing market is still dominated by the uni-directional work flow paradigm.

In some embodiments of the present invention, a color printer can upload a large color profile to the printer driver that runs on the host. The profile can be uploaded: with every job, only when the printer itself is recalibrated, on demand or at some other interval or condition. That profile can be used to compute one or more composite color transformations that can be saved to disk for reuse at a later time.

The printer driver can subsequently use this stored color transform to directly convert calibrated colors from the application color space into printer native (e.g. CMYK) colors with no more runtime computation than was previously required just to generate the PDL color space values. And because the printer firmware requires no special processing for colors specified in its native color space, the system is capable of reproducing the requested calibrated colors with no additional color transform.

Embodiments of the present invention can be used to significantly improve color work flow performance. Some embodiments comprising custom profiles may be of particular benefit.

Some embodiments of the present invention may be described with reference to FIG. 1. These embodiments comprise a color printing device 2 that comprises a printer storage medium 4. The printer storage medium 4 may comprise a hard drive, memory or other known file storage media. The color printing device 2 also comprises a calibrated output profile 12 that may be located on the printing device 2 by storing the calibrated output profile 12 on the printer storage medium 4. In some embodiments, the color printing device 2 may be connected 10 to a host computing device 6. This connection 10 between the host computing device 6 and the color printing device 2 may be effectuated via a network connection, such as through a wired or wireless computer network. The connection 10 may also be accomplished through a bi-directional USB connection or some other bi-directional communication link. The host computing device 6 of these embodiments may also comprise a host storage medium 8 for data storage. The host storage medium may comprise a printer driver 14.

In an exemplary embodiment, the host computing device may be a personal computer running a Windows operating system (OS) wherein the host storage medium is a hard disk drive.

Some embodiments of the present invention may be performed when a printer color profile is changed. This color profile may change when the printer is installed and calibrated after purchase, when an MIS department downloads a custom-profile, when a new revision of printer firmware is installed or for some other reason. As a result of this change, a new color profile may be stored in non-volatile memory in the printer or on a resource accessible to the printer. In some embodiments, the non-volatile memory may be a hard disk drive in the printer, a flash RAM or some other memory device.

In these embodiments, a printer driver may access the color profile from the printer over the network. In some embodiments, this may be done using an FTP protocol, by retrieving these data from a printer web page or by some other method. The printer driver may then combine the retrieved color transformation data with one or more "input color space" transformations to create a composite transformation. A composite transformation may then be stored for later use. Composite transformation creation may occur in the normal course of work flow or "off-line" when the printer driver would otherwise be idle.

When invoked (e.g., by an application), the printer driver may match the application's "input color space" to the appropriate composite transformation and generate device-native colors in the output PDL data stream. In some embodiments, device native colors may be expressed as RGB, CMY or CMYK, depending on the work flow. The printer driver may then transmit this PDL data stream to the printer. The printer firmware may then interpret the PDL data and mark the page.

Figure 2:
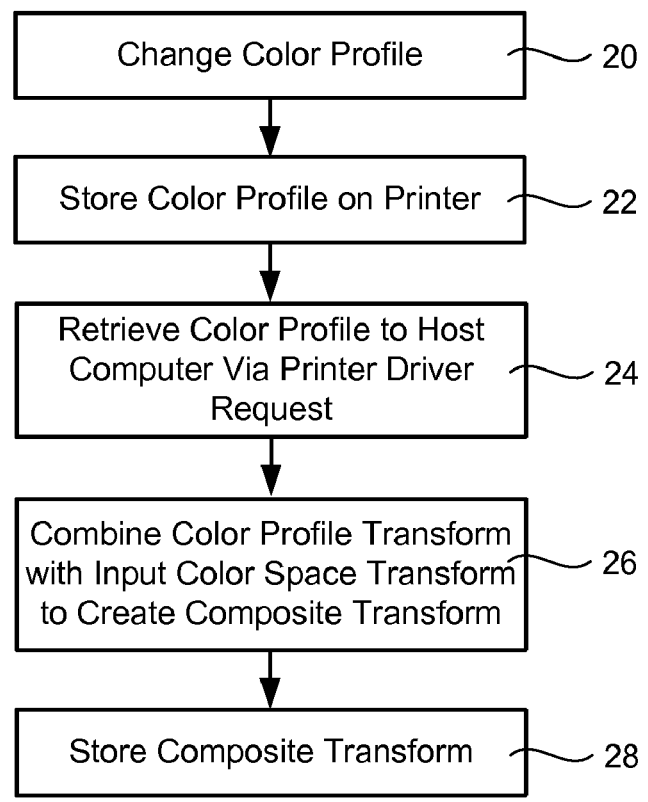
FIG. 2 is a chart showing an exemplary method of generating a composite printer transform.

Some embodiments of the present invention may be described with reference to FIG. 2. In these embodiments, a color profile change 20 may trigger the calculation of a new composite transform. Once the color profile has been changed 20, the new color profile may be stored on the printer 22. The new color profile may then be uploaded to the host computer or retrieved 24 to the host computer by request from the printer driver. When the new color profile has been received at the host computer, the color profile transform may be combined 26 with the input color space transform to create a composite transform. This composite transform may then be stored 28 at the host computer for application to subsequent print jobs.

Figure 3:
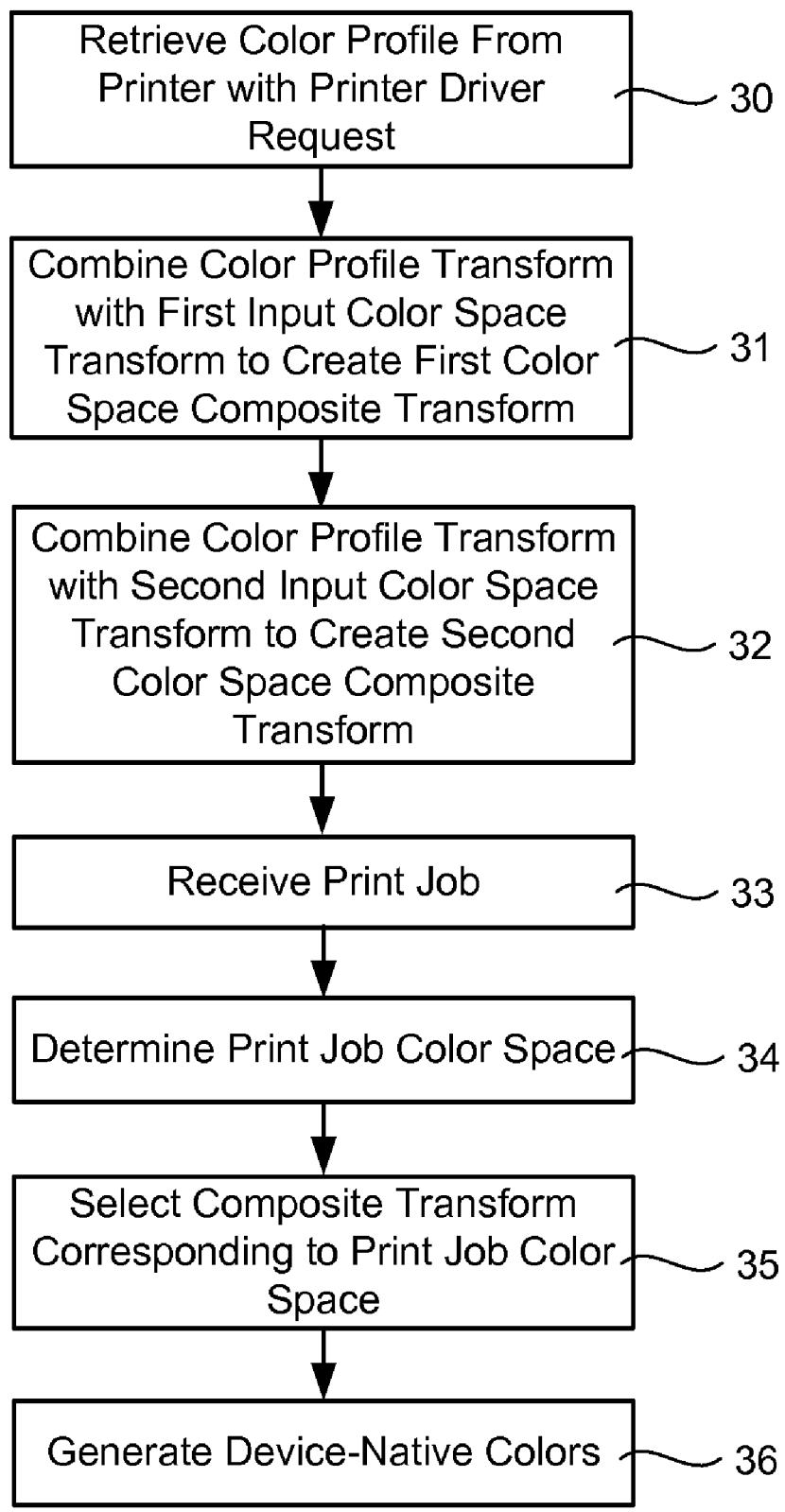
FIG. 3 is a chart showing exemplary embodiments of the present invention comprising multiple color-space-specific composite transforms.

Some embodiments of the present invention may be described with reference to FIG. 3. In these embodiments, multiple composite transforms may be stored and selected based on the color space of the print job. In these embodiments, a color profile may be retrieved 30 from the printer. This may be performed by printer driver request or by other methods.

The color profile transform may then be combined 31 with a first input color space transform thereby creating a first color space composite transform. The color profile transform may also be combined 32 with a second input color space transform thereby creating a second color space composite transform.

When a print job is received 33, the print job may be analyzed to determine 34 the input color space associated with the print job. The composite transform corresponding to the input color space of the print job may then be selected 35. When the correct color space composite transform is applied to the print job, device-native color will be generated 36.

Figure 4:
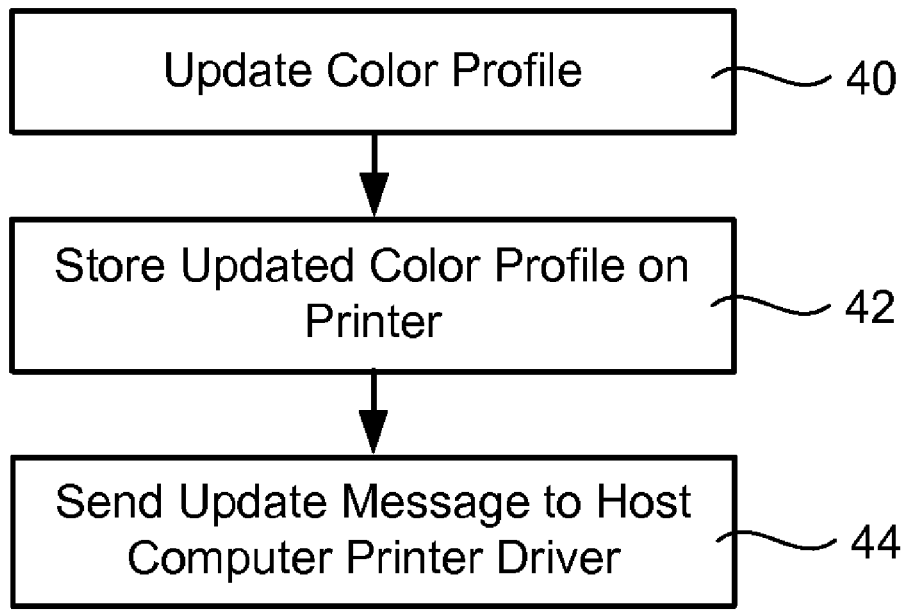
FIG. 4 is a chart showing an update message procedure.

In some embodiments of the present invention, illustrated in FIG. 4, color profile updating may be addressed. In these embodiments, a color profile may be updated 40. The update may occur when initiating a new printer, when calibrating a printer or at some other event. When the color profile is updated 40, the updated color profile may be stored 42 on the printer for access by a connected host device. In order to inform the connected host devices of the color profile update, the printer may send an update message 44 to connected host computers via their printer drivers, or by some other method. This update message may prompt the connected printer drivers to retrieve the stored, updated printer color profile.

Figure 5:
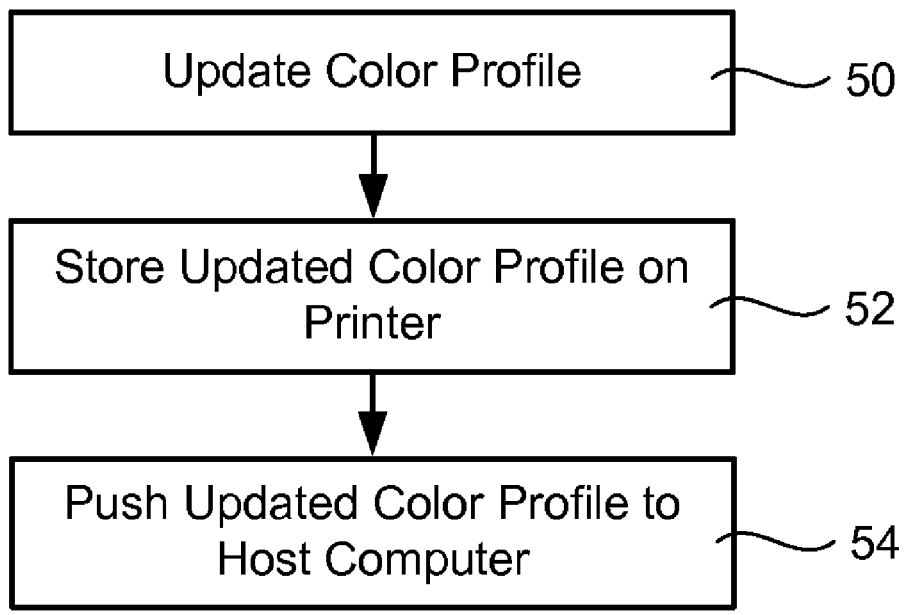
FIG. 5 is a chart showing an updated color profile push procedure.

Some embodiments of the present invention may be described with reference to FIG. 5. In these embodiments, a printer color profile may be updated 50 and stored 52 on a printer. In these embodiments, the printer may then push the updated printer color profile to any connected printers. In some embodiments, the printer may maintain a list of connected host computers to which updated color profiles may be pushed.

Figure 6:
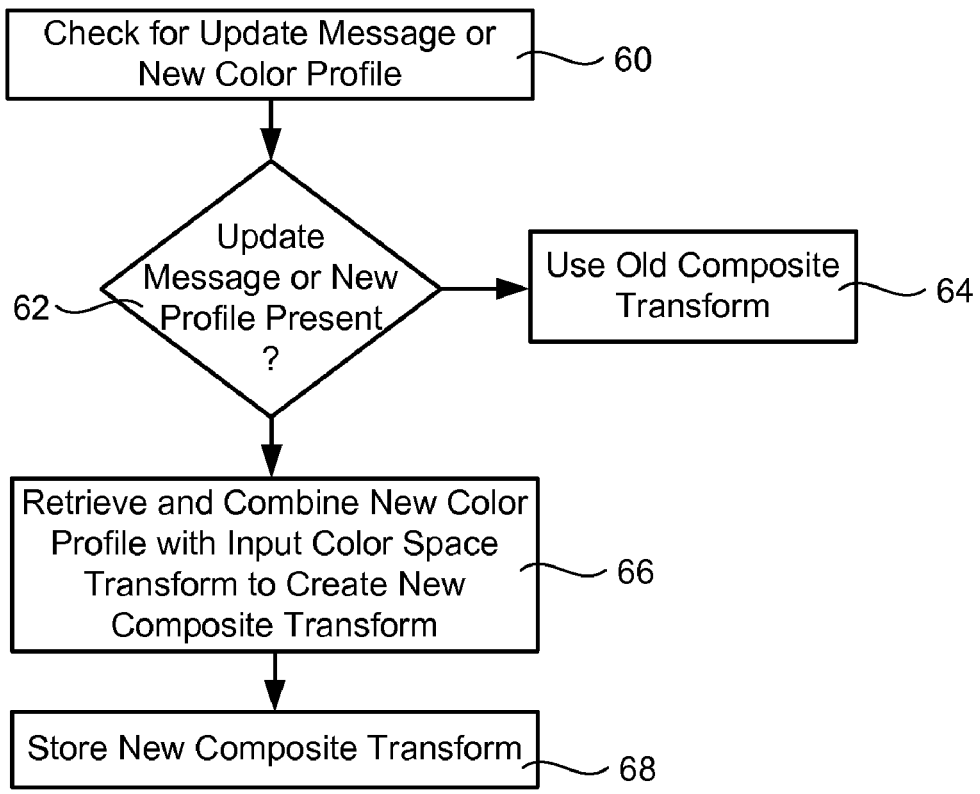
FIG. 6 is a chart showing a conditional composite transform updating procedure.

Some embodiments of the present invention may be described with reference to FIG. 6. In these embodiments, a printer driver or associated utility may check 60 for an update message from a printer. The update message may indicate that the printer has updated its color profile. If an update message has been received or a new color profile has been pushed to the host computer 62, the new color profile may be retrieved or accessed and combined with an input color space transform to create 66 a new composite transform. The new composite transform may then be stored 68 on the host computer for application to subsequent print jobs. If an update message or pushed color profile has not been received 64, the old composite transform may be used.

Figure 7:
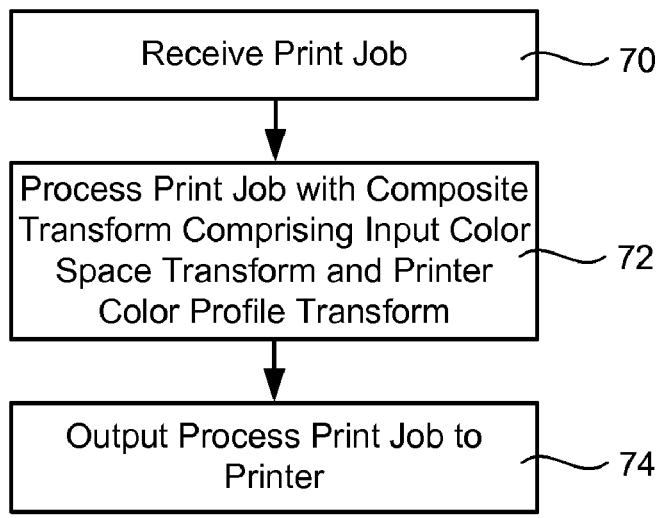
FIG. 7 is a chart showing a print job processing method using a composite transform.

Some embodiments of the present invention may be described with reference to FIG. 7. In these embodiments, a host computer comprising a printer driver with composite transform capabilities may process a print job using a composite transform. In these embodiments, a print job may be received 70 by the printer driver. In response to print job receipt, the driver may access a composite transform that has been previously created or create a composite transform by combining a color profile with an input color space transform. This composite transform may then be applied to the print job and the resulting processed print job may be sent to the printer 74 for conversion to hard copy.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for a generating a composite printer transform, said method comprising:
   a) receiving printer color profile data from a printer at a printer driver residing on a host computing device, in response to a first print job, and wherein said receiving occurs over a bi-directional connection between said printer and said host computer;
   b) accessing input color space transform data with said printer driver on said host computing device;
   c) combining said printer color profile data with said input color space transform data to create a single composite transform matrix, wherein said combining is performed by said printer driver, and where said single composite transform matrix outputs data in a device-native color space of said printer from input data in an application color space;
   d) storing said composite transform on said host computer for application to print jobs received subsequent to construction of said single composite transform matrix; and
   e) applying the stored said composite transform to a second print job, different from said first print job and initiated subsequent to said first print job.

2. The method as described in claim 1 wherein said input color space transform data is stored on said host computer accessible to said printer driver.

3. The method as described in claim 1 wherein said input color space transform data is stored on a server that is accessible to said printer driver.

4. A method for applying a color-space-specific composite transform, said method comprising:
   a) receiving, at a printer driver, printer color profile data from a printer, wherein said receiving occurs over a bi-directional connection between said printer and a host computer on which said printer driver resides;
   b) combining, with said printer driver, said color profile with a first input color space transform thereby creating a first color space composite transform;
   c) storing said first color space composite transform;
   d) combining, with said printer driver, said color profile with a second input color space transform thereby creating a second color space composite transform;
   e) storing said second color space composite transform
   f) determining a print job color space, with said printer driver, after said first color space composite transform and said second color space composite transform are respectively stored; and
   g) selecting, with said printer driver, one of the stored said first color space composite transform and the stored said second color space composite transform based on said print job color space.

5. The method as described in claim 4 where said selected color space composite transform outputs data in a device-native color space of an output device.

6. The method as described in claim 4 wherein said storing said first color space composite transform occurs at said host computer.

7. The method as described in claim 4 wherein said receiving a color profile is triggered by printer installation.

8. The method as described in claim 4 wherein said receiving a color profile is triggered by a printer color profile update.

9. The method as described in claim 4 wherein said receiving occurs as a result of said printer color profile being pushed to said host computer.

10. The method as described in claim 4 wherein said receiving occurs as a result of a request from said host computer that has received an update message.

11. An apparatus for composite transform processing, said apparatus comprising:
   a) a printer driver executable on a processor;
   b) a receiver for receiving printer color profile data from a printer operatively connected to said processor;
   c) storage storing input color space transform data at an addressable location, accessible to said printer driver, during intervals where there is no pending print job to be executed using said printer driver;
   d) wherein said printer driver comprises a combiner for combining said printer color profile data with said input color transform data to create a composite transform that outputs data in a device-native color space of said printer; and
   e) said storage stores said composite transform for application to print jobs received subsequent to construction of said single composite transform matrix.

12. The apparatus as described in claim 11 further comprising a processor for applying said composite transform to a print job to generate device-native colors.

13. The apparatus as described in claim 11 wherein said receiver receives printer color profile data from a printer in response to a printer installation.

14. The apparatus as described in claim 11 wherein said input color space transform data is stored on said apparatus accessible to a printer driver.

15. The apparatus as described in claim 11 wherein said input color space transform data is stored on a server that is accessible to said printer driver on said apparatus.

16. The apparatus as described in claim 11 further comprising a plurality of input color space transform data, wherein said combiner generates a plurality of composite transforms.

* * * * *